(12) United States Patent
Cao et al.

(10) Patent No.: US 8,600,346 B2
(45) Date of Patent: Dec. 3, 2013

(54) DATA USAGE FORECAST OF MOBILE NETWORK

(75) Inventors: Junwei Cao, Beijing (CN); Guoyu Tu, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/814,938

(22) PCT Filed: Jul. 6, 2011

(86) PCT No.: PCT/CN2011/076900
§ 371 (c)(1),
(2), (4) Date: Feb. 8, 2013

(87) PCT Pub. No.: WO2013/004013
PCT Pub. Date: Jan. 10, 2013

(65) Prior Publication Data
US 2013/0149993 A1   Jun. 13, 2013

(51) Int. Cl.
*H04M 11/00* (2006.01)

(52) U.S. Cl.
USPC ........ 455/405; 455/452.1; 370/330; 370/210; 370/228; 370/235; 370/237; 370/348; 370/395.41; 370/468; 370/458; 368/6; 368/10; 368/47

(58) Field of Classification Search
USPC ............. 455/405, 452.17; 370/210, 330, 228, 370/235, 237, 395.41, 468, 458; 368/6, 10, 368/47
See application file for complete search history.

(56) References Cited

U.S. PATENT DOCUMENTS 6,246,880 B1 * 6/2001 Iizuka ........................... 455/446
7,142,868 B1 * 11/2006 Broyles et al. ................ 455/453
2004/0116124 A1 * 6/2004 Lepschy et al. ............... 455/450
2005/0169299 A1 * 8/2005 Salo .............................. 370/458
2009/0088176 A1 * 4/2009 Teo et al. .................... 455/452.1

FOREIGN PATENT DOCUMENTS

| CN | 1333984 A | 1/2002 |
|---|---|---|
| CN | 101360319 A | 2/2009 |

OTHER PUBLICATIONS

Notification of Transmittal of the International Search Report and the Written Opinion of the International Searching Authority, Apr. 12, 2012.
Maher Al-Sanabani et al., "Mobility Prediction Based Resource Reservation for Handoff in Multimedia Wireless Cellular Networks", The International Arab Journal of Information Technology, Apr. 2008, pp. 162-169, vol. 5, No. 2.
Tung Thanh Pham et al., "An Introduction to Radio Resource Management in Cellular Systems", Printed on Mar. 14, 2011.
Ying Chen et al., "Short-Term Load Forecasting: Similar Day-Based Wavelet Neural Networks", IEEE Transactions on Power Systems, Feb. 2010, pp. 322-330, vol. 25, No. 1.
Z. Fang et al., "Survey of Pedestrian Movement and Development of a Crowd Dynamics Model", Fire Safety Journal, Aug. 2008, pp. 459-465, vol. 43, No. 6.

* cited by examiner

*Primary Examiner* — Nimesh Patel
(74) *Attorney, Agent, or Firm* — Ren-Sheng International (57) ABSTRACT

Embodiments of the present disclosure set forth a method for forecasting data usage in a region covered by a cellular network. The method includes defining a first subregion surrounding a first point of interest in the region; and calculating a forecasted usage amount of the cellular network in the first subregion in a second time slot based on a first usage amount of the first subregion in a first time slot, a second usage amount of a second subregion geographically adjacent to the first subregion in the first time slot, a first probability associated with mobile devices in the first subregion migrating to the second subregion, and a second probability associated with mobile devices in the second subregion migrating to the first subregion.

18 Claims, 5 Drawing Sheets

DATA USAGE FORECAST OF MOBILE NETWORK

CROSS-REFERENCE TO RELATED APPLICATIONS

The present application is a 371 application of International Application PCT/CN2011/076900, filed on Jul. 6, 2011 and entitled "DATA USAGE FORECAST OF MOBILE NETWORK." The International Application, including any appendices or attachments thereof, is incorporated by reference herein in its entirety.

TECHNICAL FIELD

The present disclosure relates generally to a data usage forecast, more specifically to a data usage forecast of a mobile network in a specific region.

BACKGROUND OF THE DISCLOSURE

Data usage forecast of a mobile network is important for reserving bandwidth. Through certain forecasting mechanisms, a mobile network service provider may allocate bandwidth accordingly.

SUMMARY

Some embodiments of the present disclosure may generally relate to methods for forecasting data usage in a region covered by a cellular network. One example method may include defining a first subregion surrounding a first point of interest in the region; and calculating a forecasted usage amount of the cellular network in the first subregion in a second time slot based on a first usage amount of the first subregion in a first time slot, a second usage amount of a second subregion geographically adjacent to the first subregion in the first time slot, a first probability associated with mobile devices in the first subregion migrating to the second subregion, and a second probability associated with mobile devices in the second subregion migrating to the first subregion.

Other embodiments of the present disclosure may generally relate to computer-readable media containing instructions for forecasting data usage in a region covered by a cellular network. One example computer-readable media may contain instructions, which when executed by a computing device, causes the computing device to define a first subregion surrounding a first point of interest in the region; and to calculate a forecasted usage amount of the cellular network in the first subregion in a second time slot based on a first usage amount of the first subregion in a first time slot, a second usage amount of a second subregion geographically adjacent to the first subregion in the first time slot, a first probability associated with mobile devices in the first subregion migrating to the second subregion, and a second probability associated with mobile devices in the second subregion migrating to the first subregion.

Additional embodiments of the present disclosure may generally relate to computing devices configured to forecast data usage in a region covered by a cellular network. One example computing device may contain a processing unit. The processing unit is configured to define a first subregion surrounding a first point of interest in the region; and to calculate a forecasted usage amount of the cellular network in the first subregion in a second time slot based on a first usage amount of the first subregion in a first time slot, a second usage amount of a second subregion geographically adjacent to the first subregion in the first time slot, a first probability associated with mobile devices in the first subregion migrating to the second subregion, and a second probability associated with mobile devices in the second subregion migrating to the first subregion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of forecasting data usage in a region covered by a cellular network.

In the disclosure, "transition probability" broadly refers to a probability of a mobile device located in a first place in the first time slot migrating to a second place in the second time slot which is the next time slot of the first time slot. The second place is geographically adjacent to the first place.

In some embodiments, a region covered by a cellular network may have multiple main points of interest. The region may be a city. A main point of interest may be a place having a relatively high density of mobile devices supported by the cellular network. The main point of interest may include, without limitation, a business center, a residence, a factory, a transportation station, a scenery attraction, and a school.

In some embodiments, multiple subregions may be defined in a region. A subregion may include a main point of interest. The boundary of the subregion may correspond to the movement of the cellular network supported mobile devices around the main point of interest. For example, the boundary of the subregion may be the foot traffic path around the main point of interest.

In some other embodiments, several smaller secondary subregions may be further defined in a subregion. A secondary subregion may include a secondary point of interest geographically located in the main point of interest. The density of the mobile devices in a subregion may be more than the density of the mobile devices in a secondary subregion defined in the subregion. For example, when the main point of interest is a mall, the secondary point of interest may include, without limitation, a movie theater, a restaurant, and an outlet.

In some embodiments, the subregions and the secondary subregions are defined first, but not all of them will be used for further processing. The selection may be based on a hierarchy way. For example, all subregions are selected first. If there is still enough computation resource, secondary subregions of one specific subregion will be selected.

In some embodiments, the required computation resource for forecasting data usage in the region may be based on the time units of a forecasting scenario, the total number of the forecasting scenarios, the size of the traffic matrix of a selected subregion or secondary subregion, and the total number of selected subregions and secondary subregions in the region. The time units of a forecasting scenario may equal to the product of the length of the forecasting scenario and the forecasting frequency in the forecasting scenario. For example, forecasting data usage in a region from the workdays and the weekend perspectives. Given an hourly forecasting frequency, the time units of the workdays forecasting scenario are 120 and the time units of the weekend forecasting scenario are 48.

A traffic matrix describes the transition probabilities for a specific subregion within a specific time unit. An element in the traffic matrix represents a transition probability within a specific time unit between two subregions, one subregion and one secondary subregion, or two secondary subregions. The element may be obtained through any feasible techniques, e.g., continuous sampling. The element may also be based on historical data collected in the past. The size of a traffic matrix of a subregion or a secondary subregion is associated with the number of its adjacent subregions and secondary subregions. For example, for a selected subregion which has four adjacent subregions and zero secondary subregions, the size of its traffic matrix is (4+1)×(4+1).

The required computation resource may be described by the following equation:

$$\Sigma^N_{n=1}(A_n+1)^2 \cdot \Sigma^K_{k=1} L_k f,$$

where $A_n$ is the number of adjacent subregions or secondary subregions of a selected subregion, N is the total number of the selected subregions and the secondary subregions, $L_k$ is the time units of a forecasting scenario, K is the total number of forecasting scenarios, and f is the forecasting frequency.

In the embodiments set forth above, mobile devices carried into the selected subregion are from its four adjacent subregions. Similarly, mobile devices carried out of the selected subregion move to its four adjacent subregions. In some embodiments, the data usage amount of the selected subregion in a second time slot may be based on the data usage amount of the selected subregion in a first time slot, which is an earlier time slot of the second time slot, the data usage amount of the adjacent subregions of the selected subregions in the first time slot, and the transition probability among the selected subregion and its adjacent subregions. The relationship may be illustrated by the following equation:

$$Q_0(t+1) = \Sigma^M_{m=1} Q_m(t) P_{m0} - Q_0(t) \Sigma^M_{n=1} P_{0n}.$$

where $Q_0(t-1)$ is the forecasted data usage amount of a subregion "0" at the (t+1) time slot, M is the number of subregions or secondary subregions adjacent to the subregion "0", $Q_m(t)$ is the data usage amount of a subregion "m" at the t time slot, $Q_0(t)$ is the data usage amount of the subregion "0" at the t time slot, $P_{m0}$ is the transition probability of mobile devices migrating from the subregion "m" to the subregion "0", and $P_{0n}$ is the transition probability of mobile devices migrating from the subregion "0" to the subregion "n".

In response to the forecasted data usage amount of the selected subregion in the second time slot may, the base station in the subregion or secondary subregion is configured to allocate the network bandwidth. In some embodiments, the forecasted data usage may be used to optimize the downlink/uplink channel allocation by predicting which link will need additional capacity. In some other embodiments, the forecasted data use may be helpful for channel allocation among neighboring cells and handoff decisions.

Figure 1A:
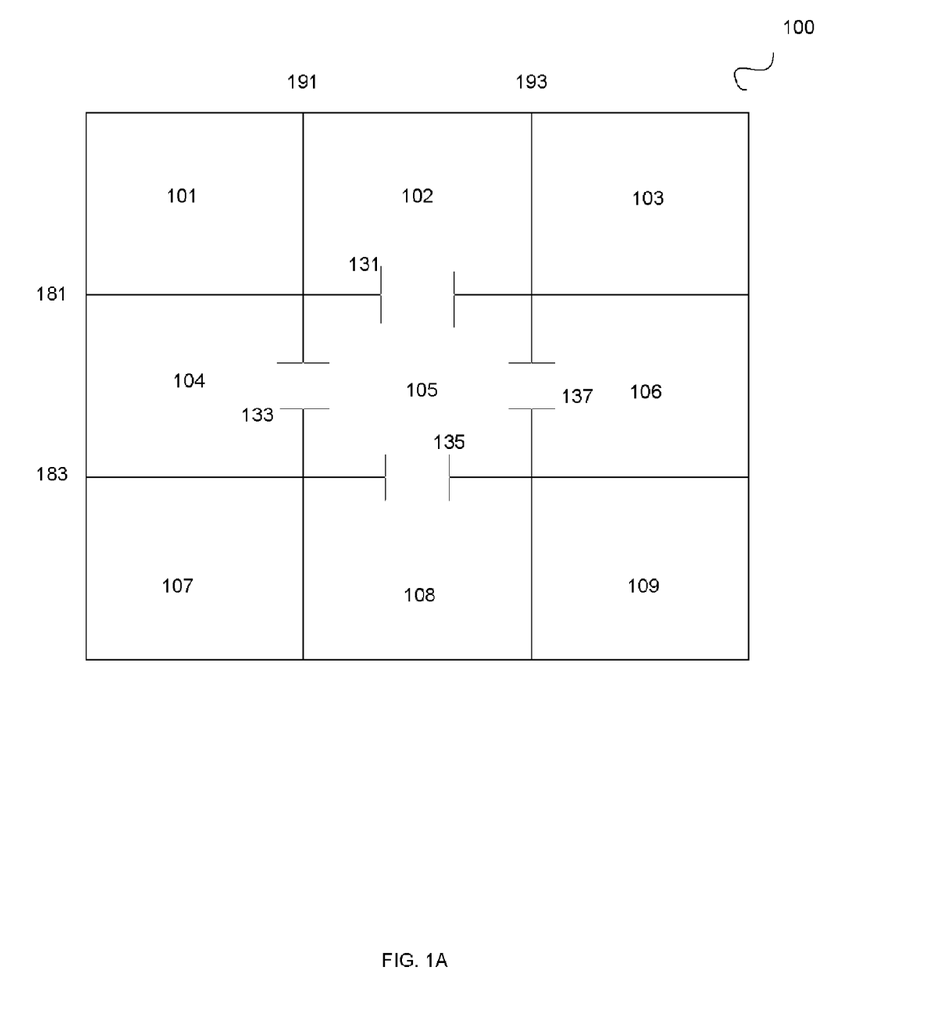
FIG. 1A illustrates an arrangement of subregions defined in a region.

FIG. 1A illustrates an arrangement of subregions defined in a region according to some embodiments of the disclosure. Region 100 is a city. The region 100 includes first street 191, second street 193, first avenue 181, and second avenue 183. Nine subregions 101, 102, 103 . . . 109 are defined in region 100. Subregion 105 is a block surrounded by first street 191, second street 193, first avenue 181, and second avenue 183. Subregion 105 may include a mall which can be entered or left from any one of first gate 133 on first street 191, second gate 137 on second street 193, third gate 131 on first avenue 181, and fourth gate 135 on second avenue 183.

Figure 1B:
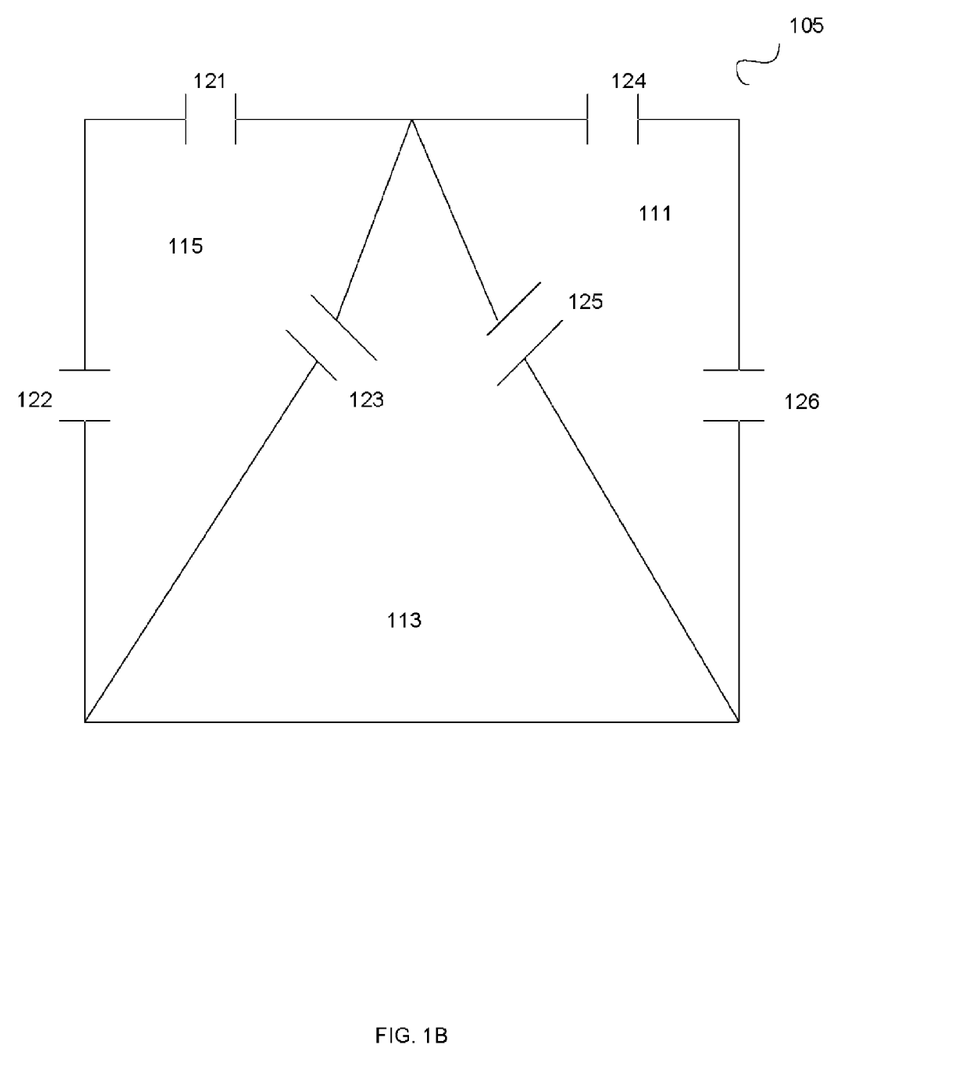
FIG. 1B illustrates an arrangement of secondary subregions defined in a subregion.

FIG. 1B illustrates an arrangement of secondary subregions defined in a subregion according to some embodiments of the disclosure. As set forth above, subregion 105 includes a mall. The mall includes outlet 111, movie theater 113, and restaurant 115. Gates 121, 122, 123, 124, 125, and 126 are the entrances/exits for outlet 111, movie theater 113, or restaurant 115.

In some embodiments, when forecasting data usage in subregion 105 for a day on an hourly basis, the forecasting may include constructing 24 traffic matrices for the subregion 105. Each traffic matrix represents transition probabilities within an hour in sequence. As set forth above, any one of the traffic matrix is a (4+1)×(4+1) matrix. Any one of the traffic matrix may represent hourly transition probability between the subregion 105, and its adjacent subregions 102, 104, 106, and 108. Elements in one matrix include transition probabilities from subregion 105 to its adjacent subregions 102, 104, 106, 108, and from the adjacent subregions 102, 104, 106, 108 to subregion 105.

The forecasting may further include checking whether the computation resource is capable of forecasting data usage in subregion 105 based on the required condition set forth above, e.g., the number of subregions to be forecasted, the size of the traffic matrices of the subregions to be forecasted, the forecasting frequency, and the total duration of the forecast.

The forecasting may further include calculating a forecasted usage amount in subregion 105 in a second time slot. The forecasted usage amount may be calculated by the following equation:

$$Q_{105}(2)=Q_{102}(1)P_{102105}+Q_{106}(1)P_{106105}+Q_{108}(1)$$
$$P_{108105}+Q_{104}(1)P_{104105}-Q_{105}(1)P_{105102}-Q_{105}(1)$$
$$P_{105106}-Q_{105}(1)P_{105108}-Q_{105}(1)P_{105104}.$$

where $P_{102105}$, $P_{106105}$, $P_{108105}$, $P_{104105}$, $P_{105102}$, $P_{105106}$, $P_{105108}$, $P_{105104}$ are obtained from the first matrix of the 24 matrices. The transition probabilities may be based on historical collected data. $Q_x(1)$, where x=102, 104, 105, 106, and 108, represents the data usage of a specific subregion at a first time slot, which is the previous time slot of the second time slot. $Q_x(1)$ may be retrieved from the base station. In response to the data access request from mobile devices in the specific subregion within the first time slot, the base station may transmit/receive data to/from the mobile devices and relevant information is recorded in the base station.

Figure 2:
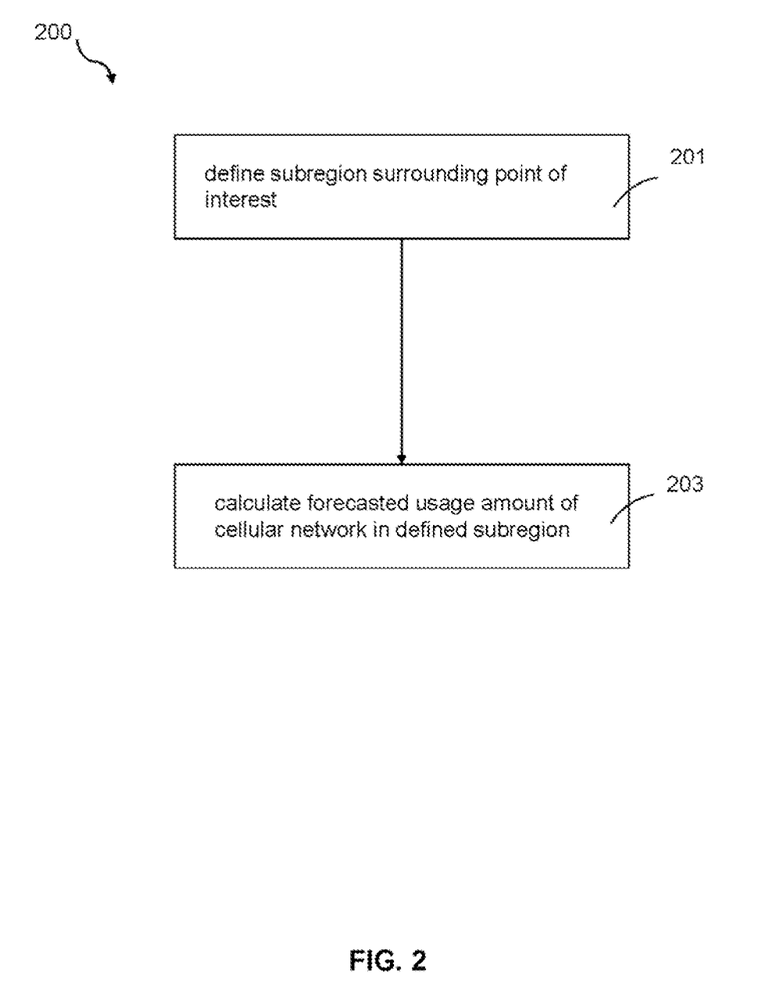
FIG. 2 is a flow chart of a method for forecasting data usage in a region covered by a cellular network.

FIG. 2 is a flow chart of an illustrative embodiment of a method 200 for forecasting data usage in a region covered by a cellular network. The method 200 may include one or more operations, functions, or actions illustrated by blocks 201 and 203. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. The method 200 may begin at block 201.

At block 201, the method 200 includes defining a subregion in the region covered by the cellular network. In some embodiments, the subregion surrounds a point of interest. The point of interest may be a place having a relatively high density of mobile devices supported by the cellular network. The boundary of the subregion may correspond to the movement of the mobile devices around the point of interest. The method 200 continues at block 203.

At block 203, the method 200 includes calculating a forecasted usage amount of cellular network in the subregion defined at block 201 in a second time slot. The calculating may be based on the usage amount of the subregion in a first time slot prior to the second time slot, the usage amount of a place geographically adjacent to the subregion in the first time slot, a first transition probability of mobile devices in the subregion migrating to the place, and a second transition probability of mobile devices in the place migrating to the subregion.

Figure 3:
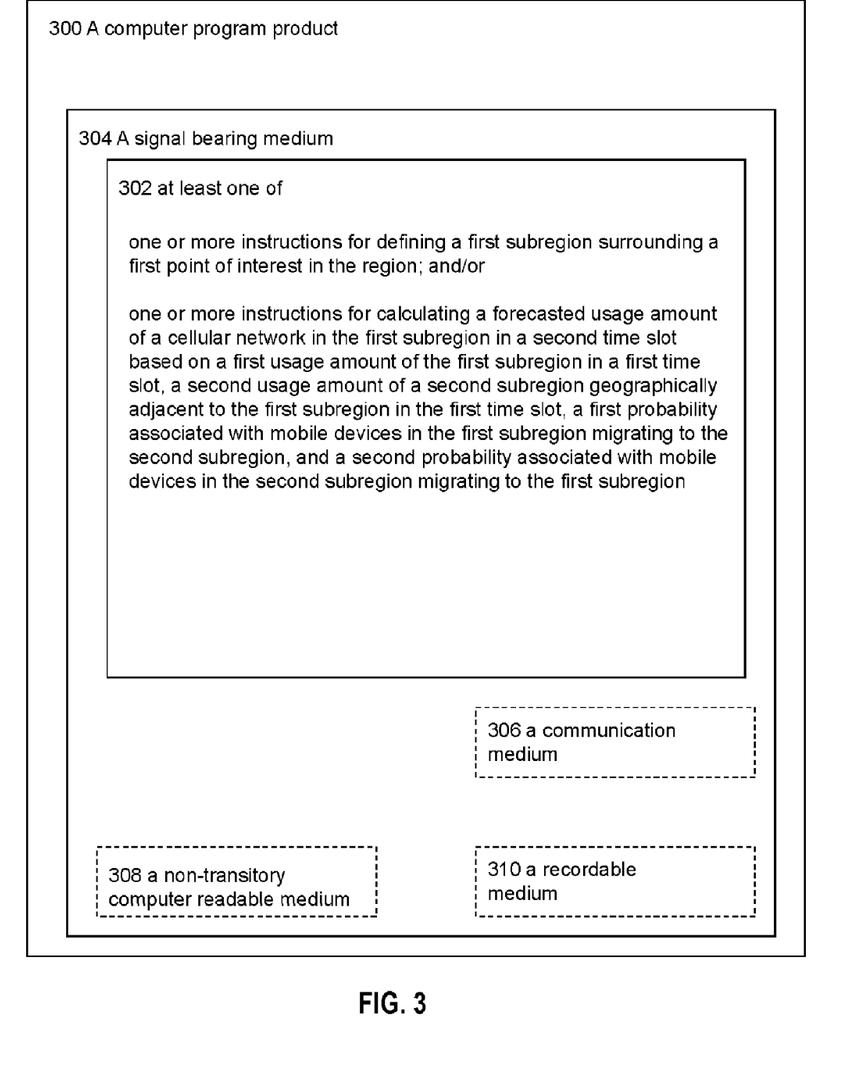
FIG. 3 shows a block diagram illustrating a computer program product that is arranged for forecasting data usage in a region covered by a cellular network.

FIG. 3 shows a block diagram illustrating a computer program product that is arranged for selecting a preferred data set. The computer program product 300 may include a signal bearing medium 304, which may include one or more sets of executable instructions 302 that, when executed by, for example, a processor of a computing device, may provide at least the functionality described above and illustrated in FIG. 2.

In some implementations, the signal bearing medium 304 may encompass a non-transitory computer readable medium 308, such as, but not limited to, a hard disk drive, a Compact Disc (CD), a Digital Versatile Disk (DVD), a digital tape, memory, etc. In some implementations, the signal bearing medium 304 may encompass a recordable medium 310, such as, but not limited to, memory, read/write (R/W) CDs, R/W DVDs, etc. In some implementations, the signal bearing medium 304 may encompass a communications medium 306, such as, but not limited to, a digital and/or an analog communication medium (e.g., a fiber optic cable, a waveguide, a wired communications link, a wireless communication link, etc.) The computer program product 300 may also be recorded in the non-transitory computer readable medium 308 or another similar recordable medium 310.

Figure 4:
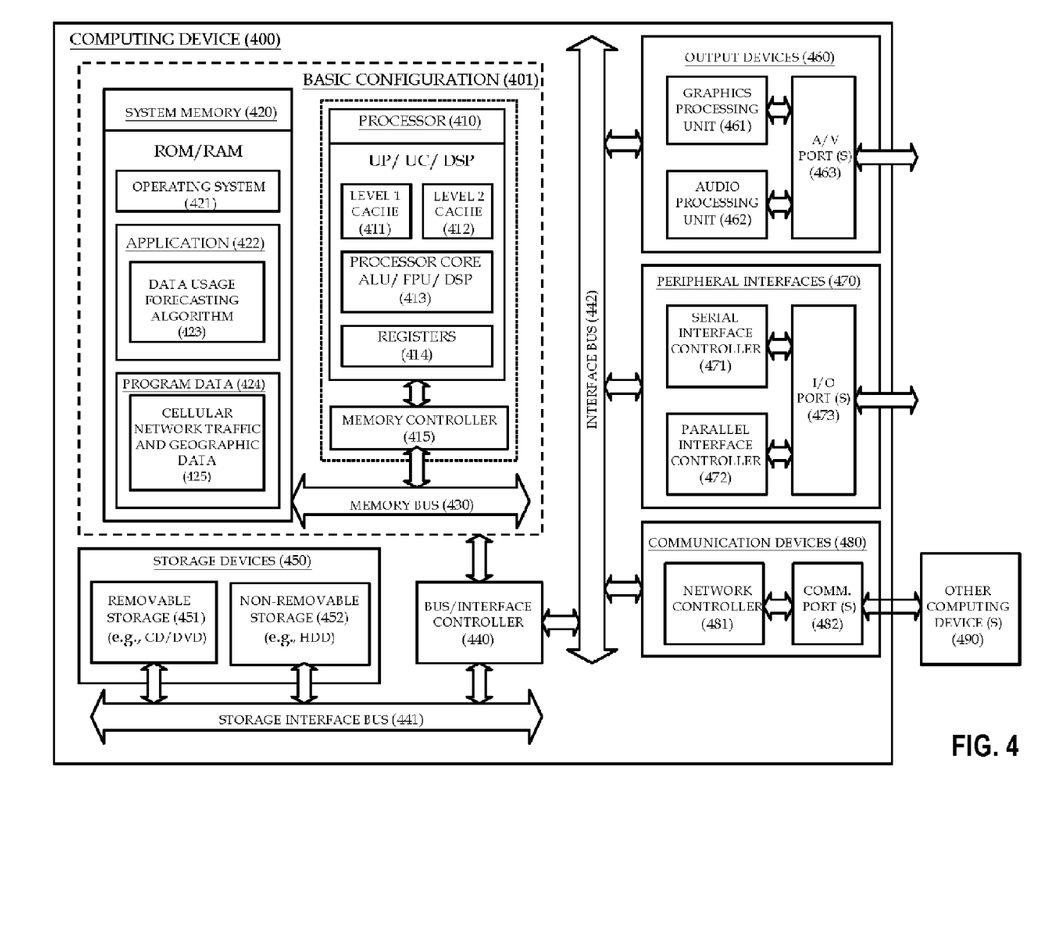
FIG. 4 shows a block diagram illustrating a computing device that is arranged for forecasting data usage in a region covered by a cellular network, all arranged in accordance with at least some embodiments of the present disclosure.

FIG. 4 shows a block diagram of an illustrative embodiment of a computing device that is arranged for forecasting data usage in a region covered by a cellular network. In a very basic configuration 401, computing device 400 typically includes one or more processors 410 and a system memory 420. A memory bus 430 may be used for communicating between processor 410 and system memory 420.

Depending on the desired configuration, processor 410 may be of any type including but not limited to a microprocessor (μP), a microcontroller (μC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. In some embodiments, application 422 may include a data usage forecasting algorithm 423 that is arranged to perform the functions as described herein including those described with respect to the steps 201 and 203 of the method 200 of FIG. 2. Program data 424 may include cellular network traffic and geographic data 425 that may be useful for the operation of data usage forecasting algorithm 423 as will be further described below. In some embodiments, the cellular network traffic and geographic data 425 may include, without limitation, geographic data associated with defined subregions and/or secondary subregions and transition probabilities between geographically adjacent two subregions, one subregion and one secondary subregion, or two secondary subregions. In some embodiments, application 422 may be arranged to operate with program data 424 on operating system 421 such that implementations of selecting preferred data set may be provided as described herein. This described basic configuration 401 is illustrated in FIG. 4 by those components within the inner dashed line.

In some other embodiments, application 422 may include data usage forecasting algorithm 423 that is arranged to perform the functions as described herein including those described with respect to the steps 201 and 203 of the method 200 of FIG. 2.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. Data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage devices 451 and non-removable storage devices 452 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output devices 460, peripheral interfaces 470, and communication devices 480) to basic configuration 401 via bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482. In some embodiments, the other computing devices 490 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for forecasting data usage in a region covered by a cellular network, comprising:
    defining, by one or more processors of a computing device configured to forecast data usage in the cellular network, a first subregion surrounding a first point of interest in the region;
    receiving, by the one or more processors, a first usage amount of the first subregion in a first time slot and a second usage amount of a second subregion geographically adjacent to the first subregion in the first time slot collected by one or more base stations in the cellular network;
    calculating, by the one or more processors, a forecasted usage amount of the cellular network in the first subregion in a second time slot based on the first usage amount of the first subregion in the first time slot, the second usage amount of the second subregion in the first time slot, a first probability associated with mobile devices in the first subregion migrating to the second subregion, and a second probability associated with mobile devices in the second subregion migrating to the first subregion, wherein the first time slot is an earlier time slot with respect to the second time slot; and
    reserving a bandwidth of the cellular network in the region based on the forecasted usage amount of the cellular network.

2. The method of claim 1, wherein the boundary of the first subregion approximately corresponds to movement of mobile devices around the first point of interest.

3. The method of claim 1, wherein a first density of mobile devices associated with the first point of interest is greater than a first threshold.

4. The method of claim 3, further comprising defining a third subregion in the first subregion, wherein the third subregion surrounds a third point of interest having a third density of mobile devices that is greater than a third threshold but less than the first threshold.

5. The method of claim 4, further comprising determining whether to calculate the usage of the cellular network in the third subregion based on a predefined frequency factor, a predefined time slot, and the number of subregions defined in the region.

6. The method of claim 1, wherein the reserving a bandwidth of the cellular network comprises reserving the bandwidth of the cellular network in the first subregion in the second time slot based on the forecasted usage amount of the cellular network.

7. A non-transitory computer-readable storage medium encoded with computer-executable instructions for forecasting data usage in a region covered by a cellular network, which when executed by a processor of a computing device configured to forecast data usage in the cellular network, causes the computing device to:
define a first subregion surrounding a first point of interest in the region;
receive a first usage amount of the first subregion in a first time slot and a second usage amount of a second subregion geographically adjacent to the first subregion in the first time slot collected by one or more base stations in the cellular network;
calculate a forecasted usage amount of the cellular network in the first subregion in a second time slot based on the first usage amount of the first subregion in the first time slot, the second usage amount of the second subregion in the first time slot, a first probability associated with mobile devices in the first subregion migrating to the second subregion, and a second probability associated with mobile devices in the second subregion migrating to the first subregion, wherein the first time slot is an earlier time slot with respect to the second time slot; and
reserve a bandwidth of the cellular network in the region based on the forecasted usage amount of the cellular network.

8. The non-transitory computer-readable storage medium of claim 7, wherein the boundary of the first subregion approximately corresponds to movement of mobile devices around the first point of interest.

9. The non-transitory computer-readable storage medium of claim 7, wherein a first density of mobile devices associated with the first point of interest is greater than a first threshold.

10. The non-transitory computer-readable storage medium of claim 9, further containing additional instructions, which when executed by the computing device, causes the computing device to define a third subregion in the first subregion, wherein the third subregion surrounds a third point of interest having a third density of mobile devices greater than a third threshold but less than the first threshold.

11. The non-transitory computer-readable storage medium of claim 10, further containing additional instructions, which when executed by the computing device, causes the computing device to determine whether to calculate the usage of the cellular network in the third subregion based on a predefined frequency factor, a predefined time slot, and the number of subregions defined in the region.

12. The non-transitory computer-readable storage medium of claim 7, wherein the bandwidth of the cellular network in the first subregion in the second time slot is reserved based on the forecasted usage amount of the cellular network.

13. A computing device configured to forecast data usage in a region covered by a cellular network, comprising:
a computer storage medium; and
a processing unit, wherein in response to the processing unit executing instructions encoded in the computer storage medium, the processing unit is configured to:
define a first subregion surrounding a first point of interest in the region,
receive a first usage amount of the first subregion in a first time slot and a second usage amount of a second subregion geographically adjacent to the first subregion in the first time slot collected by one or more base stations in the cellular network,
calculate a forecasted usage amount of the cellular network in the first subregion in a second time slot based on the first usage amount of the first subregion in the first time slot, the second usage amount of the second subregion in the first time slot, a first probability associated with mobile devices in the first subregion migrating to the second subregion, and a second probability associated with mobile devices in the second subregion migrating to the first subregion, wherein the first time slot is an earlier time slot with respect to the second time slot, and
reserve a bandwidth of the cellular network in the region based on the forecasted usage amount of the cellular network.

14. The computing device of claim 13, wherein the boundary of the first subregion approximately corresponds to movement of mobile devices around the first point of interest.

15. The computing device of claim 13, wherein a first density of mobile devices associated with the first point of interest is greater than a first threshold.

16. The computing device of claim 15, wherein the processing unit is further configured to define a third subregion in the first subregion, wherein the third subregion surrounds a third point of interest having a third density of mobile devices greater than a third threshold but less than the first threshold.

17. The computing device of claim 16, wherein the processing unit is further configured to determine whether to calculate the usage of the cellular network in the third subregion based on a predefined frequency factor, a predefined time slot, and the number of subregions defined in the region.

18. The computing device of claim 13, wherein the processing unit is further configured to reserve the bandwidth of the cellular network in the first subregion in the second time slot based on the forecasted usage amount of the cellular network.

* * * * *

UNITED STATES PATENT AND TRADEMARK OFFICE
CERTIFICATE OF CORRECTION

PATENT NO. : 8,600,346 B2  
APPLICATION NO. : 13/814938  
DATED : December 3, 2013  
INVENTOR(S) : Cao et al.

Page 1 of 1

It is certified that error appears in the above-identified patent and that said Letters Patent is hereby corrected as shown below:

In the Claims

In Column 12, Line 47, in Claim 18, delete "further configured" and insert -- configured --, therefor.

Signed and Sealed this
Twenty-sixth Day of August, 2014

Michelle K. Lee
*Deputy Director of the United States Patent and Trademark Office*